US012561714B2

(12) United States Patent
Blackburn et al.

(10) Patent No.: US 12,561,714 B2
(45) Date of Patent: Feb. 24, 2026

(54) SYSTEMS AND METHODS FOR AUTOMATICALLY DETERMINING USER VETERAN ATTRIBUTES AND UPDATING A VETERAN PROFILE

(71) Applicant: Wells Fargo Bank, N.A., San Francisco, CA (US)

(72) Inventors: Justin Blackburn, Litchfield Park, AZ (US); Edward Sverko, Charlotte, NC (US); John Brader, Charlotte, NC (US); Tyrone Taylor, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/516,488

(22) Filed: Nov. 21, 2023

(65) Prior Publication Data

US 2025/0166004 A1     May 22, 2025

(51) Int. Cl.
*G06Q 30/02* (2023.01)
*G06Q 30/0201* (2023.01)
*G06Q 30/0207* (2023.01)

(52) U.S. Cl.
CPC ... *G06Q 30/0236* (2013.01); *G06Q 30/02011* (2025.08)

(58) Field of Classification Search
None
See application file for complete search history.

(56) References Cited

U.S. PATENT DOCUMENTS

| | | | | |
|---|---|---|---|---|
| 8,600,851 | B1 * | 12/2013 | Pacheco | G06Q 40/04 |
| | | | | 705/35 |
| 8,805,883 | B1 * | 8/2014 | Vaughn | G06F 16/9535 |
| | | | | 707/784 |
| 10,497,077 | B1 * | 12/2019 | LaVahn | G07F 19/00 |
| 11,321,736 | B2 | 5/2022 | Lagi | |
| 2003/0069839 | A1 * | 4/2003 | Whittington | G06Q 40/03 |
| | | | | 705/38 |
| 2009/0192827 | A1 * | 7/2009 | Andersen | G06Q 40/08 |
| | | | | 705/4 |

(Continued)

FOREIGN PATENT DOCUMENTS

WO     WO-2019173397 A1 *  9/2019  ........ G06Q 30/0609

*Primary Examiner* — Vincent M Cao
(74) *Attorney, Agent, or Firm* — K&L Gates LLP

(57) ABSTRACT

Systems, apparatuses, methods, and computer program products are disclosed for automatically updating a veteran profile for a user. An example method includes identifying a veteran attribute data field with a data value associated with an unassigned status within a veteran profile of the user. The example method further includes generating a user input data set comprising data instances extracted from user data using a preprocessing model and determining (a) a candidate data value for the veteran attribute data field, and (b) a confidence score for the candidate data value, using an attribute identification model. The example method further includes updating the veteran profile with the candidate data value as the data value for the veteran attribute data field in an instance in which the confidence score satisfies a confidence score threshold. The example method further includes generating and providing a tailored user recommendation based on the veteran profile.

20 Claims, 8 Drawing Sheets

(56)          References Cited

U.S. PATENT DOCUMENTS

| 2013/0073539 A1* | 3/2013 | Bowser | ............... | G06F 16/9536 |
| | | | | 707/E17.014 |
| 2013/0166467 A1* | 6/2013 | Carroll | ................... | G06Q 50/20 |
| | | | | 705/327 |
| 2013/0254035 A1* | 9/2013 | Ramer | ............... | G06Q 30/0267 |
| | | | | 705/14.62 |
| 2014/0025427 A1* | 1/2014 | Bastian | ........... | G06Q 10/06398 |
| | | | | 705/7.29 |
| 2015/0347917 A1* | 12/2015 | Hua | ......................... | G06N 7/01 |
| | | | | 706/52 |
| 2017/0300933 A1* | 10/2017 | Mascaro | ................... | G06N 7/01 |
| 2017/0308807 A1* | 10/2017 | Hauth | ............... | G06F 16/24578 |
| 2020/0175553 A1* | 6/2020 | Yalamanchili | ..... | G06Q 30/0276 |
| 2020/0364743 A1* | 11/2020 | Lerner | ............... | G06Q 30/0244 |
| 2021/0192024 A1 | 6/2021 | Hall | | |
| 2023/0026228 A1 | 1/2023 | Robinson-Morgan | | |

* cited by examiner

Determine a veteran status for the user
302

Affirmative
veteran status?
304

NO

YES

Generate veteran profile
306

Identify a veteran attribute data field with a data value associated with an
unassigned status
308

Generate a user input data set
310

To 312

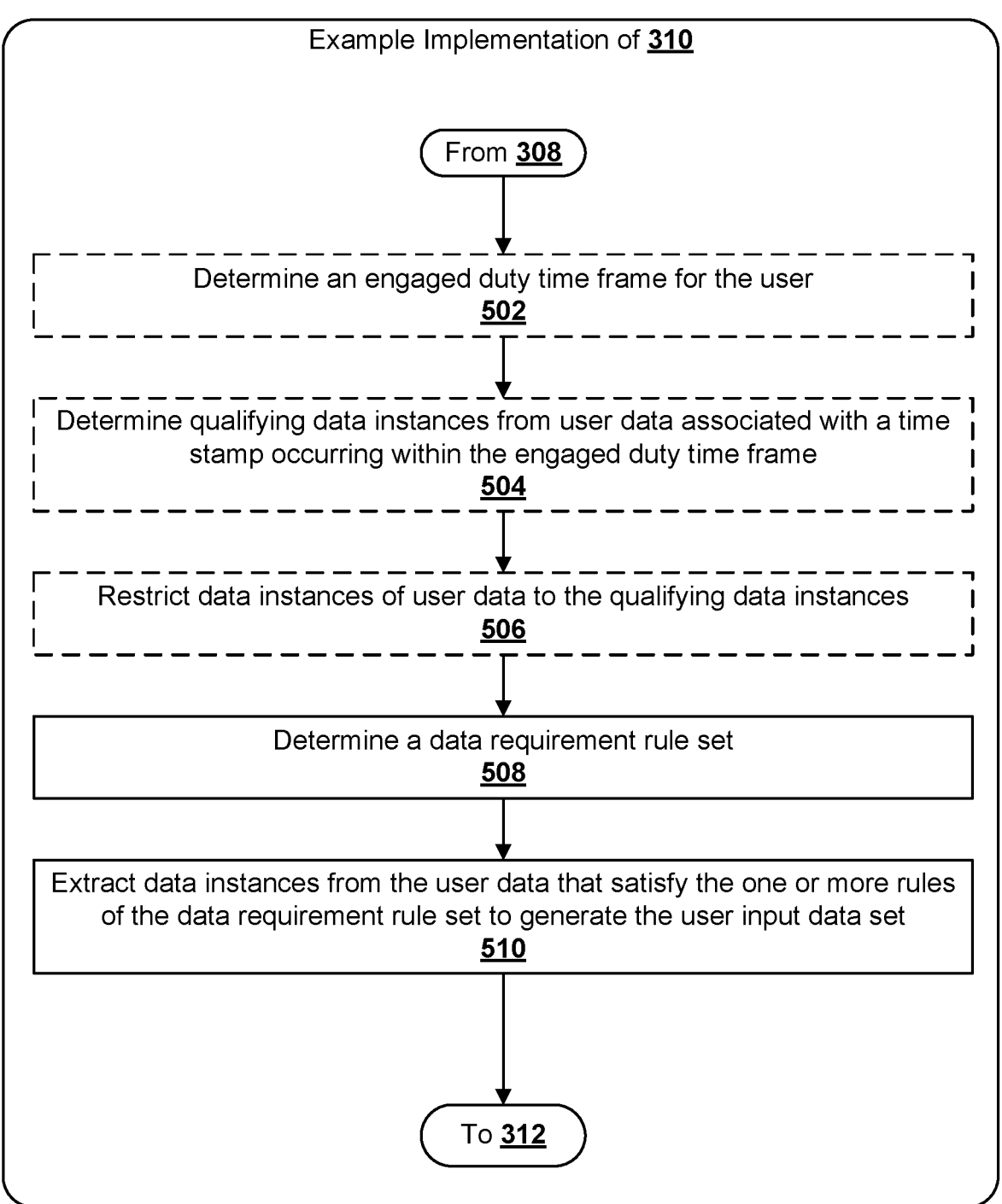

Example Implementation of 310

From 308

Determine an engaged duty time frame for the user
502

Determine qualifying data instances from user data associated with a time stamp occurring within the engaged duty time frame
504

Restrict data instances of user data to the qualifying data instances
506

Determine a data requirement rule set
508

Extract data instances from the user data that satisfy the one or more rules of the data requirement rule set to generate the user input data set
510

SYSTEMS AND METHODS FOR AUTOMATICALLY DETERMINING USER VETERAN ATTRIBUTES AND UPDATING A VETERAN PROFILE

BACKGROUND

Military service members may be eligible for certain benefits and/or programs as a way to express appreciation and gratitude for their service. Currently, all eligible military service members receive the same benefits and/or enrollment into programs regardless of their service background.

BRIEF SUMMARY

Veterans in the United States are eligible for a wide range of benefits as a result of their military service. These benefits are provided by the Department of Veteran Affairs (VA) and other government agencies. Additionally, certain private entities also may offer benefits to military service members. Some common benefits offered to veterans include healthcare, disability compensation, education, pension, employment assistance, home loans, life insurance, tax exemptions, etc. As described above, currently all eligible military service members receive the same benefits and/or enrollment into programs regardless of their service background. For example, a military veteran who has completed five years in the U.S. Army is eligible for the same benefits as a military veteran who has completed ten years in the U.S. Navy. While the eligibility of users into these benefits and/or programs is common among all military service members, these offered benefits and/or programs fail to consider more granular attributes of the service member, such as the branch of military served, years served, rank, active duty tours, etc. Thus, currently offered benefits and/or programs are not tailored to address veteran user needs.

Furthermore, existing technologies require military service members to manually self-identify as a veteran. In addition, handling self-declaration forms and manually verifying veteran status and/or veteran attributes can also be an administratively burdensome process that can cause delays in processing and potential backlogs, impose challenges in ensuring compliance with changing eligibility criteria or regulations, increase susceptibility to errors or fraudulent claims, result in misclassification of eligibility, and/or undermine the integrity of veteran benefit programs. There is a unique need for a technical solution that (a) functions independently of any manual activity of a user, (b) can systematically identify veteran attributes for identified veterans, and (c) reliably presents a user with qualifying veteran-specific benefits that are offered by an establishment. A complex solution of this nature requires a systematic and computer-based implementation. Accordingly, there exists an underlying technical necessity for systems that are able to autonomously provide this capability.

To alleviate this manual burden from users, example embodiments described herein automatically determine veteran attributes for a user without requiring users to manually provide these values and use the determined veteran attributes to update a veteran profile. Example embodiments described herein generate a veteran profile for a user determined to be associated with an affirmative veteran status. The veteran profile may include one or more data values for one or more veteran attribute data fields. Example embodiments may further identify a veteran attribute data field associated with an unassigned status as a data value. A preprocessing model may then generate a user input data set that includes relevant data instances extracted from user data. The relevant data instances may include data instances of a certain data type or from a particular data source that are determined to be highly correlated with the veteran attribute data field. Thus, this selective generation of the user input data set may result in only correlated data instances in the user input data set, thereby reducing associated computational resources required for subsequent processing of the user input data set.

An attribute identification model may then receive the user input data set as input and determine a candidate data value for the veteran attribute data field as well as a confidence score for the candidate data value. In an instance in which the confidence score satisfies a confidence score threshold, the candidate data value may be assigned as the data value for the veteran attribute data field. In this way, the assignment of candidate data values as data values for the veteran attribute field allows the veteran profile to maintain a high level of integrity such that the resulting assigned data values are accurate. Furthermore, the confidence score threshold may be adjusted based on the particular veteran attribute data field. Thus, the confidence score threshold may be flexible and allow for dynamic adjustment considerate of the various levels of complexity in determining data values between veteran attribute data fields. This process may be repeated for each veteran attribute data field with a data value associated with an unassigned status such that a veteran profile of the user may include a robust and accurate set of veteran attributes for the user.

Once the veteran profile for the user has been updated to assign candidate data values as the data value for veteran attribute data fields, a tailored user recommendation may be generated and provided to the user. The tailored user recommendation may include one or more data values included in the veteran profile such that the tailored user recommendation is customized to the user. In some examples, the tailored user recommendation may be generated in response to a trigger event that is determined to be relevant based on the veteran profile of the user. Thus, the tailored user recommendation may be generated in response to the occurrence of a trigger event determined to be relevant to the user. Additionally, the tailored user recommendation may include one or more offers and/or benefits for the user determined to be relevant for the user based on the veteran profile.

In some embodiments, the assignment of data values associated with an unassigned for multiple veteran attribute data fields may be performed simultaneously, via parallel processing, such that data values may be assigned to these veteran attribute data fields in real time or near real time. Thus, this may allow users to realize the benefits they are eligible for in real time or near real time, and any perceived delay due to additional processes is mitigated. Additionally, simultaneous performance of the proactive operations may help avoid any benefit delays for users that are time sensitive. For example, a credit card user account of the user may raise the interest in excess of what a veteran user account is capped at because it was previously unknown that the user was a veteran. While a retroactive fix may be applied to the user account, this results in a waste of computational resources and may require additional computations to the effect the improper interest increase had on the user account. Thus, it may be particularly advantageous to perform proactive operations simultaneously to improve the speed at which this documentation is generated and provided and, thereby, decrease the risk of changes being applied to a user account that conflict with offered benefits.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 5 illustrates an example flowchart for generating a user input data set, in accordance with some example embodiments described herein.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers, programmable automation controllers, industrial computers, desktop computers, personal data assistants, laptop computers, tablet computers, smart books, palm-top computers, personal computers, smartphones, wearable devices (such as headsets, smartwatches, or the like), and similar electronic devices equipped with at least a processor and any other physical components necessary to perform the various operations described herein. Devices such as smartphones, laptop computers, tablet computers, and wearable devices are generally collectively referred to as "mobile devices."

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
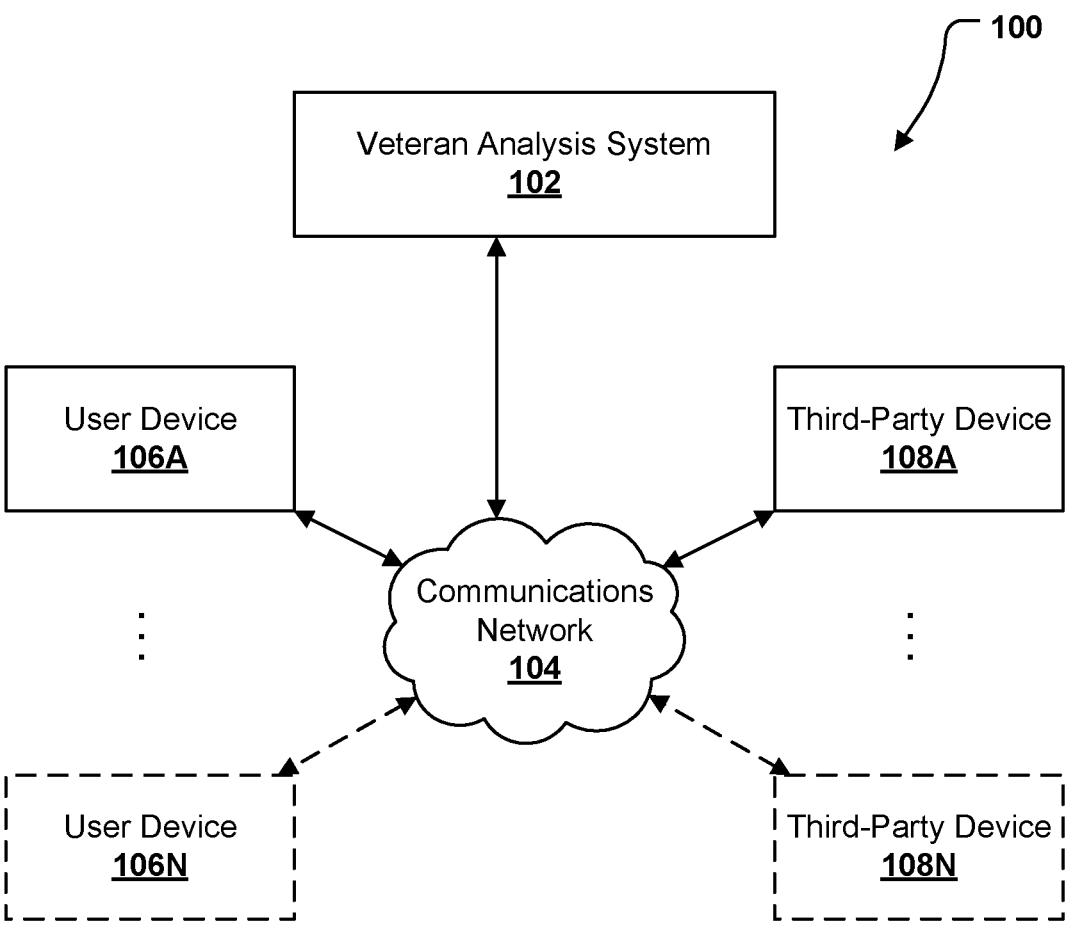
FIG. 1 illustrates a system in which some example embodiments may be used to automatically update a veteran profile for a user.

Example embodiments described herein may be implemented using any of a variety of computing devices or servers. To this end, FIG. 1 illustrates an example environment 100 within which various embodiments may operate. As illustrated, a veteran analysis system 102 may receive and/or transmit information via communications network 104 (e.g., the Internet) with any number of other devices, such as one or more of user devices 106A-106N and/or third-party devices 108A-108N.

The veteran analysis system 102 may be implemented as one or more computing devices or servers, which may be composed of a series of components. Particular components of the veteran analysis system 102 are described in greater detail below with reference to apparatus 200 in connection with FIG. 2.

In some embodiments, the veteran analysis system 102 further includes a storage device that comprises a distinct component from other components of the veteran analysis system 102. The storage device may be embodied as one or more direct-attached storage devices (such as hard drives, solid-state drives, optical disc drives, or the like) or may alternatively comprise one or more network-attached storage devices independently connected to a communications network (e.g., communications network 104). The storage device may host the software executed to operate the veteran analysis system 102. The storage device may store information relied upon during operation of the veteran analysis system 102, such as various models (e.g., the preprocessing model and attribute identification model), a veteran profile, a user input data set, user data, etc., which may be used by the veteran analysis system 102, data and documents to be analyzed using the veteran analysis system 102, or the like. In addition, the storage device may store control signals, device characteristics, and access credentials enabling interaction between the veteran analysis system 102 and one or more of the user devices 106A-106N or third-party devices 108A-108N.

The one or more user devices 106A-106N and the one or more third-party devices 108A-108N may be embodied by any computing devices known in the art. The one or more user devices 106A-106N and the one or more third-party devices 108A-108N need not themselves be independent devices, but they may be peripheral devices communicatively coupled to other computing devices. In some embodiments, one or more of the third-party devices 108A-108N may be associated with a particular third-party entity. For example, third-party devices 108A-108C may be associated with the National Archives' National Personnel Record Center (NPRC), third-party devices 108D-108E may be associated with a medical facility, and third-party devices 108F-108G may be associated with the Internal Revenue Service.

Although FIG. 1 illustrates an environment and implementation in which the veteran analysis system 102 interacts indirectly with a user via one or more of user devices 106A-106N and/or third-party devices 108A-108N, in some embodiments, users may directly interact with the veteran analysis system 102 (e.g., via communications hardware of the veteran analysis system 102), in which case a separate user device 106A-106N and/or third-party device 108A-108N may not be utilized. Whether by way of direct interaction or indirect interaction via another device, a user may communicate with, operate, control, modify, or otherwise interact with the veteran analysis system 102 to perform the various functions and achieve the various benefits described herein.

Example Implementing Apparatuses

Figure 2:
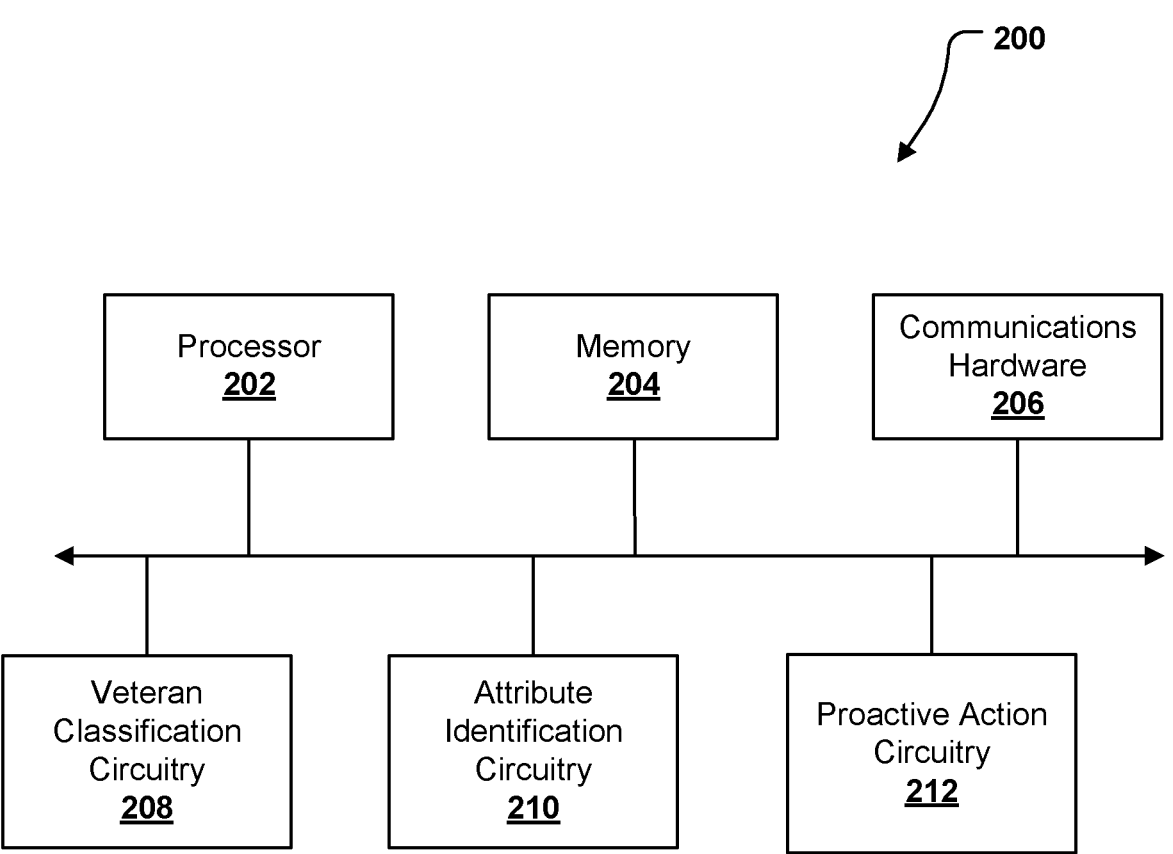
FIG. 2 illustrates a schematic block diagram of example circuitry embodying a system device that may perform various operations, in accordance with some example embodiments described herein.

The veteran analysis system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3A-5. As illustrated in FIG. 2, the apparatus 200 may include processor 202, memory 204, communications hardware 206, veteran classification circuitry 208, attribute identification circuitry 210, and proactive action circuitry 212, each of which will be described in greater detail below.

The processor 202 (and/or co-processor or any other processor assisting or otherwise associated with the processor) may be in communication with the memory 204 via a bus for passing information among components of the apparatus. The processor 202 may be embodied in a number of different ways and may, for example, include one or more processing devices configured to perform independently. Furthermore, the processor 202 may include one or more processors configured in tandem via a bus to enable independent execution of software instructions, pipelining, and/or multithreading. The use of the term "processor" may be understood to include a single-core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor 202 may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, software instructions, or the like for enabling the apparatus 200 to carry out various functions in accordance with example embodiments contemplated herein.

The communications hardware 206 may be any means, such as a device or circuitry embodied in either hardware or a combination of hardware and software, that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In particular, in some embodiments, the communications hardware 206 may be configured to provide a tailored user recommendation. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises veteran classification circuitry 208 that is configured to determine a veteran status for the user, generate a veteran profile for the user, determine whether a confirmatory data instance is included in the user data, and/or the like. The veteran classification circuitry 208 may utilize processor 202, memory 204, or any other hardware component included in the apparatus 200 to perform these operations, as described in connection with FIGS. 3A-5 below. The veteran classification circuitry 208 may further utilize communications hardware 206 to gather data from a variety of sources (e.g., user devices 106A-106N and/or third-party devices 108A-108N, as shown in FIG. 1) and/or exchange data with a user.

In addition, the apparatus 200 further comprises an attribute identification circuitry 210 that is configured to identify a veteran attribute data field with a data value associated with an unassigned status, generate a user input data set, determine a candidate data value for the veteran attribute data field and determine a confidence score for the candidate data value, and adjust a confidence score threshold. The attribute identification circuitry 210 may further be configured to determine a data requirement rule set and extract a data instance from user data. The attribute identification circuitry 210 may further be configured to determine an engaged duty time frame, determine qualifying data instances from the user data, and restrict the data instances of the user data to the qualifying data instances. The attribute identification circuitry 210 may utilize processor 202, memory 204, or any other hardware component included in the apparatus 200 to perform these operations, as described in connection with FIGS. 3A-5 below. The attribute identification circuitry 210 may further utilize communications hardware 206 to gather data from a variety of sources (e.g., user devices 106A-106N and/or third-party devices 108A-108N, as shown in FIG. 1) and/or exchange data with a user.

In addition, the apparatus 200 further comprises a proactive action circuitry 212 that is configured to generate a tailored user recommendation and detect a trigger event. The proactive action circuitry 212 may utilize processor 202, memory 204, or any other hardware component included in the apparatus 200 to perform these operations, as described in connection with FIGS. 3A-5 below. The proactive action circuitry 212 may further utilize communications hardware 206 to gather data from a variety of sources (e.g., user devices 106A-106N and/or third-party devices 108A-108N, as shown in FIG. 1) and/or exchange data with a user.

Although components 202-212 are described in part using functional language, it will be understood that the particular implementations necessarily include the use of particular hardware. It should also be understood that certain of these components 202-212 may include similar or common hardware. For example, the veteran classification circuitry 208, attribute identification circuitry 210, and proactive action circuitry 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus 200 therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the veteran classification circuitry 208, attribute identification circuitry 210, and proactive action circuitry 212 may leverage processor 202, memory 204, or communications hardware 206 as described above, it will be understood that any of veteran classification circuitry 208, attribute identification circuitry 210, and proactive action circuitry 212 may include one or more dedicated processor, specially configured field programmable gate array, or application-specific interface circuit to perform its corresponding functions and may accordingly leverage processor 202 executing software stored in a memory (e.g., memory 204) or communications hardware 206 for enabling any functions not performed by special-purpose hardware. In all embodiments, however, it will be understood that veteran classification circuitry 208, attribute identification circuitry 210, and proactive action circuitry 212 comprise particular machinery designed for performing the functions described herein in connection with such elements of the apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third-party circuitry. For example, a given apparatus 200 may access one or more third-party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of graphical user interfaces (each, a GUI) and flowcharts.

Example Operations

FIGS. 3A-5 illustrate example flowcharts that contain example operations implemented by example embodiments described herein. The operations illustrated in FIGS. 3A-5 may, for example, be performed by a system device of the veteran analysis system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, veteran classification circuitry 208, attribute identification circuitry 210, proactive action circuitry 212, and/or any combination thereof. It will be understood that user interaction with the veteran analysis system 102 may occur directly via communications hardware 206 or may instead be facilitated by a separate user device 106A-106N or third-party device 108A-108N, as shown in FIG. 1, and may have similar or equivalent physical componentry facilitating such user interaction.

Figure 3A:
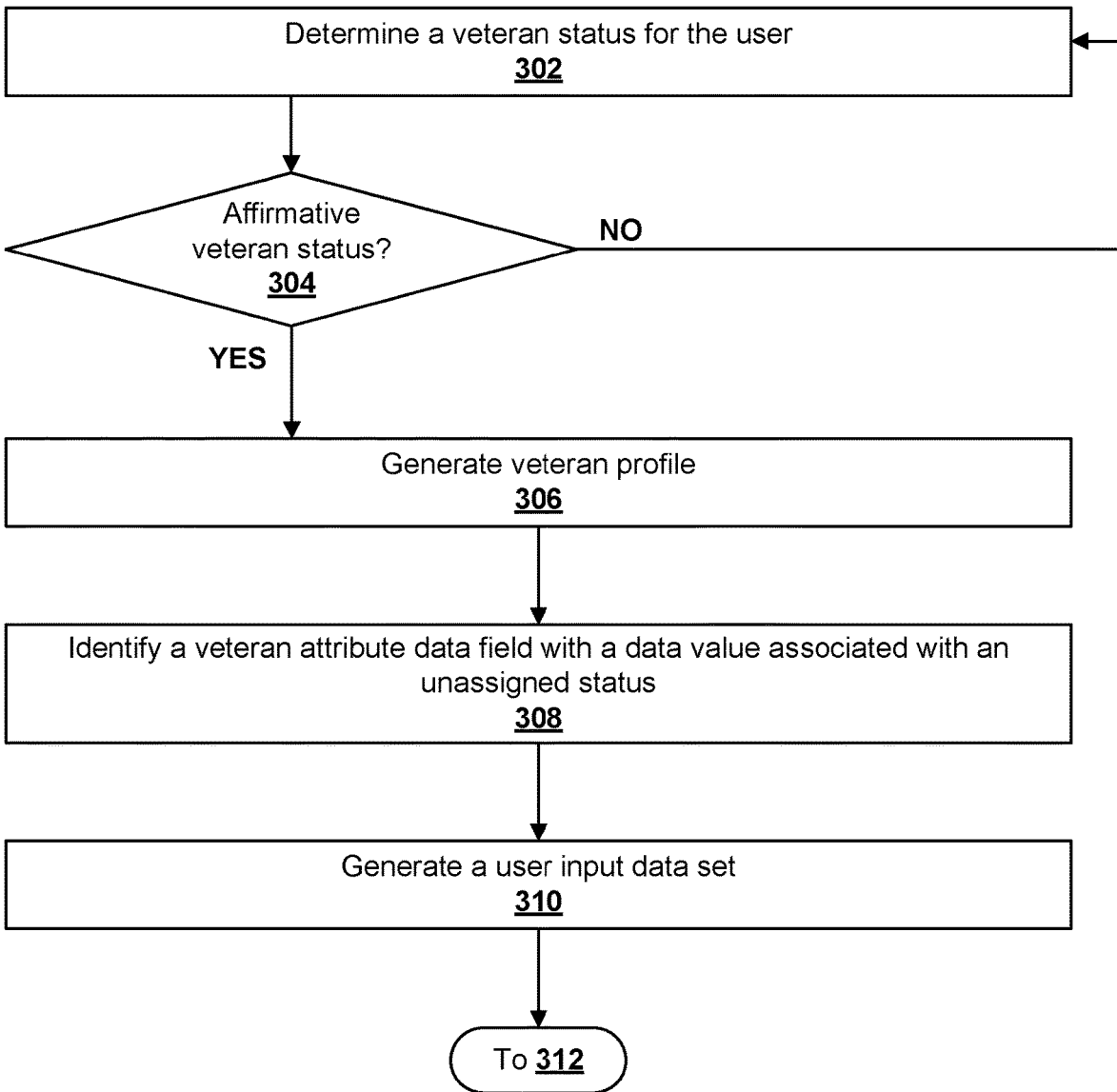
FIGS. 3A-3B illustrate example flowcharts for determining data values for veteran attribute data fields and updating a veteran profile of the user, in accordance with some example embodiments described herein.
Figure 3B:
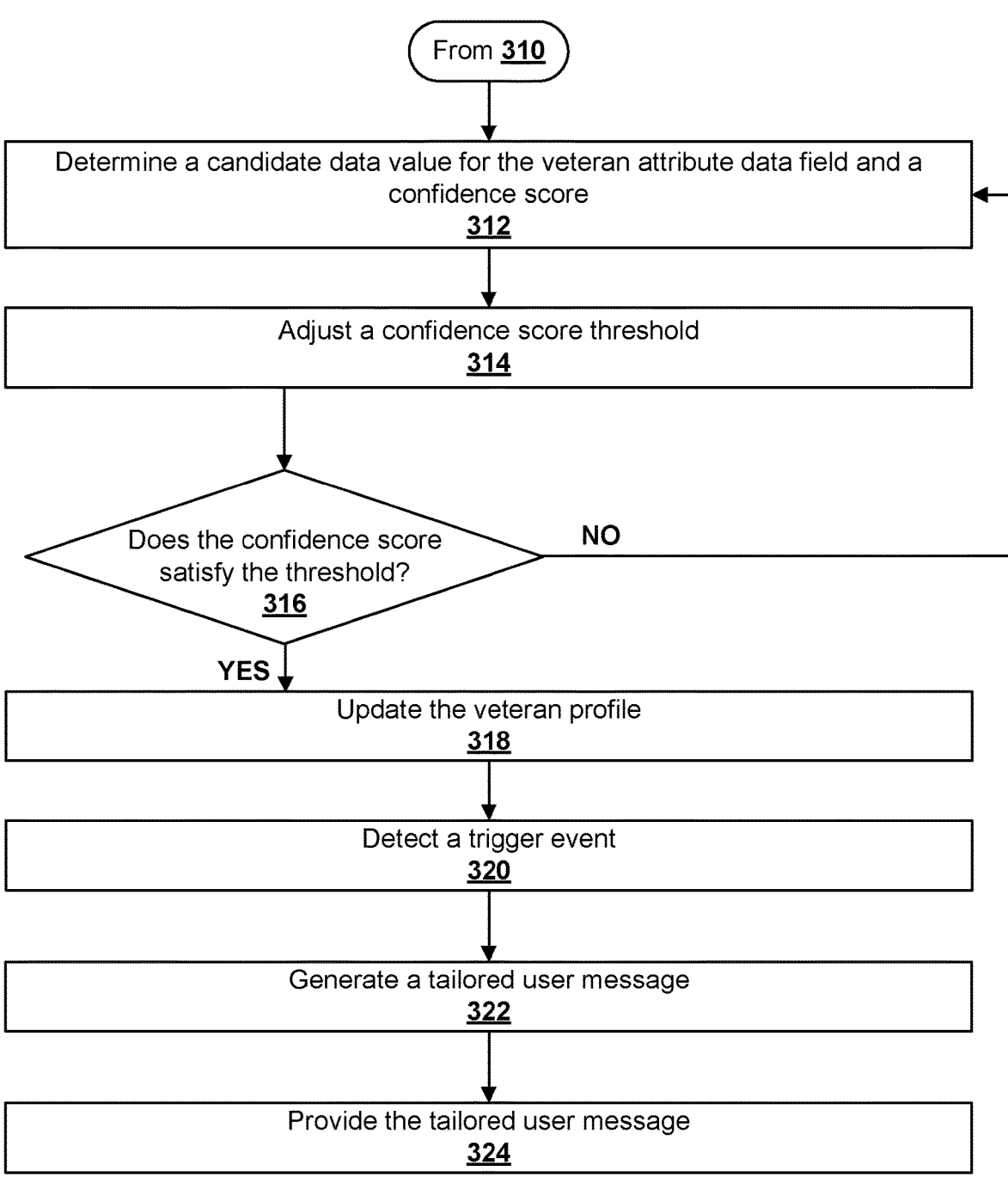

Turning first to FIGS. 3A-3B, example operations are shown for determining data values for veteran attribute data fields and updating a veteran profile. By performing the operations described in FIGS. 3A-3B, example operations allow for the generation and maintenance of a robust and accurate veteran profile for the user. The veteran profile may include data values for one or more veteran attribute data fields. These data values, in turn, may be used for detection of a trigger event and/or during generation of a tailored user message. In this way, the tailored user message may include personalized information for the user and may be provided in real time in response to situations determined to be relevant to the user.

As shown by operation 302, the apparatus 200 includes means, such as processor 202, memory 204, communications hardware 206, veteran classification circuitry 208, or the like, for determining a veteran status for the user. As an initial matter, the veteran classification circuitry 208 must first determine whether a veteran profile should be generated for a user. A veteran profile is only generated for users determined to be associated with an affirmative veteran status. An affirmative veteran status is indicative that the user is currently a military service member or previously was a military service member. As described in further detail below, the veteran classification circuitry 208 may use user data associated with the user to automatically determine a veteran status for the user. A veteran status may describe a categorical relationship of the user with the military, such as an "active-duty" status, "veteran" status, or "non-veteran" status. Alternatively, the veteran status may describe a Boolean operator for the veteran status, such as "true" or "false" or "1" or "0." Veteran statuses representative that the user currently serves or has previously served as a military service member (e.g., statuses of "active-duty," "veteran," "true," "1," or the like) may result in the generation of a veteran profile, whereas other veteran statuses (e.g., statuses of "non-veteran," "false," "0," or the like) do not.

Figure 4:
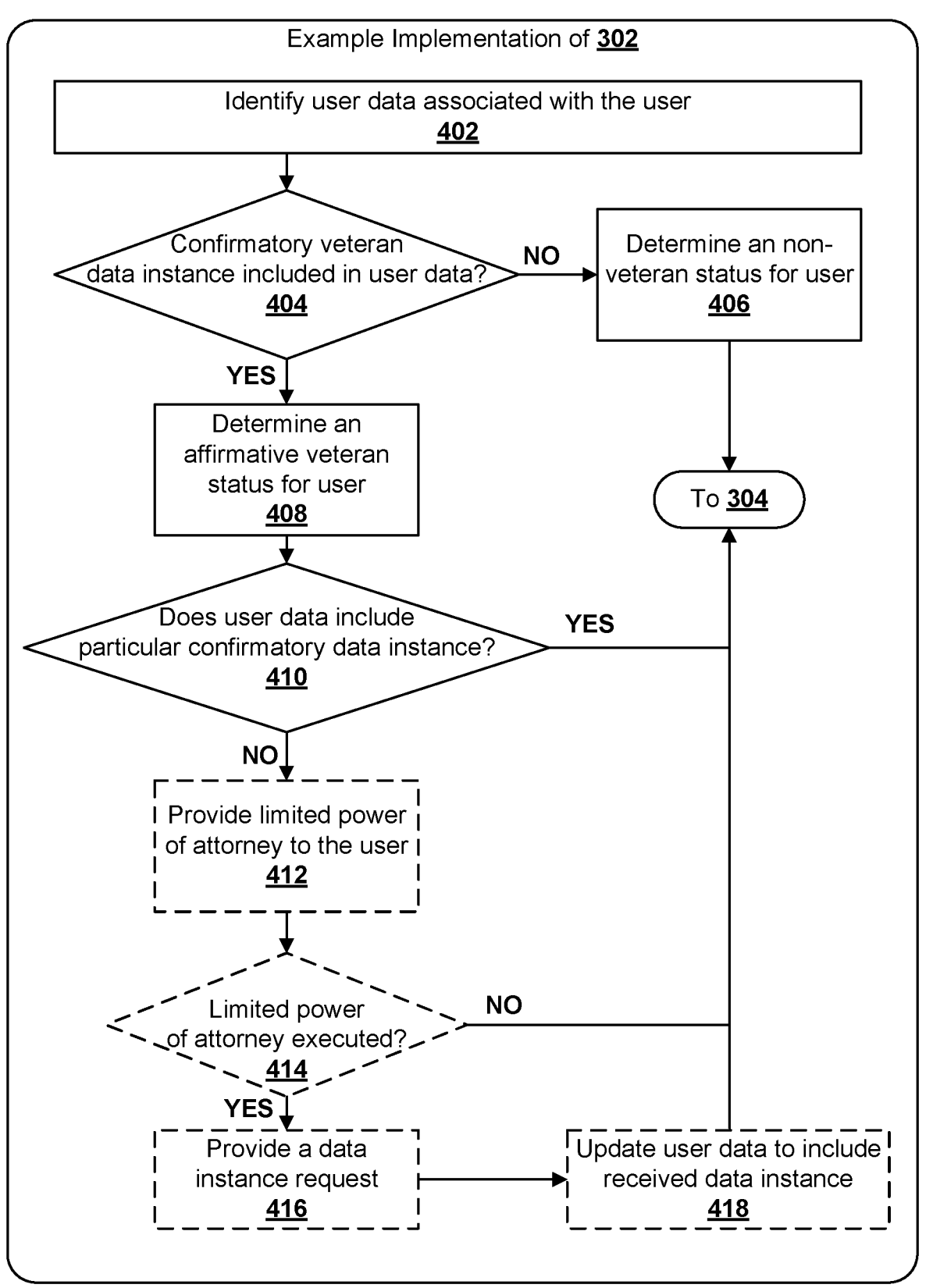
FIG. 4 illustrates an example flowchart for determining a veteran status for the user, in accordance with some example embodiments described herein.

In some embodiments, operation 302 may be performed in accordance with the operations described by FIG. 4.

Turning now to FIG. 4, example operations are shown for determining a veteran status for the user based on identified associated user data.

As shown by operation 402, the apparatus 200 includes means, such as processor 202, memory 204, communications hardware 206, veteran classification circuitry 208, or the like, for identifying user data associated with the user. In some embodiments, the user may be associated with a user profile that may include user data. The user profile of the user may be stored and/or maintained in memory 204 or another repository. In some embodiments, the user profile may include an indication of one or more user accounts associated with the user. The one or more associated user accounts may include various account information and, in some embodiments, transactions and associated metadata. For example, veteran analysis system 102 may be associated with a financial institution and the user profile may include a checking user account, savings user account, credit user account, etc. A user profile may be associated with a user identifier that is unique to the user, such that a user identifier for a user may be used to find the corresponding user profile for a particular user. Additionally, the user profile may include one or more user parameters corresponding to the user, such as a user name (e.g., first name, last name, middle name, and/or middle initial), a physical address and address history, an email address, a phone number, associated device information, device identification numbers, and/or the like. The user profile may additionally include user data. User data may correspond to one or more data instances in any structured or unstructured format (e.g., word processing documents, images formats (e.g., joint photographic experts group (JPEG), portable network graphics (PNG), tag image file format (TIFF), or the like), portable document format (PDFs), spreadsheets, text files, comma-separated values (CSV) files, and/or the like).

Each data instance included in the user data may be associated with time stamps indicative of when the data instance occurred and/or was received. For example, a Department of Defense form (DD form) 214 may be associated with a time stamp indicative of when the DD form 214 was received by communications hardware and another time stamp indicative of when the DD form 214 was generated. Furthermore, each data instance may be associated with a data type and/or data source. The associated data type may describe the type of data to which the data instance corresponds. For example, a data type may include a transaction data type, a received payment data type, a mortgage data type, a car loan data type, a student loan data type, a government document data type, an address data type, a demographic data type, and/or the like. Additionally, a data instance may be associated with a data source indicative of where the data instance was generated from or was received from. For example, a data source may include a self-reported data source, a proofed data source (e.g., input received from an authorized user, such as an employee), particular government data sources, particular private data sources, particular social media data sources, and/or the like. Data sources may additionally have different levels of granularity. For example, a government data source may include a Department of Defense data source, a Defense Finance Accounting Service (DFAS) data source, a VA data source, an NPRC data source, a military-affiliate data source (e.g., Naval Submarine Base New London), and/or the like.

The user data included in the user profile may be gathered and/or curated from any number of data sources, such as from user account activity associated with the user profile, online government databases, available or accessible private entity information, social media data environments, and/or the like. For example, a transaction occurring within a user account included in the user profile may automatically be logged as a data instance. The transaction may include transaction information such as a sender, recipient, transaction amount, transaction date and/or time stamp, supplemental data (e.g., information on the memo line), and/or the like. As another example, a user data instance may include a DD form 214 received from the NPRC. The DD form 214 may be a veteran discharge record for the user. In some embodiments, the user may directly provide user data instances either online (e.g., via an online portal or mobile application) or in-person (e.g., via an in-person visit to a facility associated with managing the user profile).

As shown by operation 404, the apparatus 200 includes means, such as processor 202, memory 204, veteran classification circuitry 208, or the like, for determining whether the user data includes a confirmatory veteran data instance. In some embodiments, the veteran classification circuitry 208 may process the user data to determine whether any one of the data instances included in the user data corresponds to a confirmatory data instance. In some examples, a confirmatory data instance corresponds to a data instance that may be so correlated and specific to veterans that it may serve as absolute evidence that a user is currently a military service member or has previously served in the military. For example, a confirmatory data instance may include a DD form 214, a DD form 220, received payments from DFAS, received payments from the VA, transactions with a VA medical institution, associated user accounts with military-specific requirements, a verified military identification card, and/or the like.

In some embodiments, the veteran classification circuitry 208 may be configured with confirmatory veteran data instance requirements. These confirmatory veteran data instance requirements may serve as a set of rules that the veteran classification circuitry 208 may use to identify potential confirmatory veteran data instances in a more streamlined manner. In particular, the confirmatory veteran data instance requirements may be indicative of data types and/or data sources associated with confirmatory veteran data instances. As such, the veteran classification circuitry 208 may narrow down data instances included in the user data to only data instances that satisfy the confirmatory data instance requirements.

In some embodiments, the communications hardware 206 may receive an indication from an authorized user (e.g., an employee of an institution associated with apparatus 200) that the user has manually provided a confirmatory data instance, such as during an in-person visit to an institution branch. In particular, the authorized user may update a veteran status of the user to an appropriate veteran status that may be an affirmative veteran status, such that the confirmatory data instance is determined through authorized user input.

In an instance in which it is determined that the user data fails to include a confirmatory veteran data instance, the process proceeds to operation 406. As shown by operation 406, the apparatus 200 includes means, such as processor 202, memory 204, veteran classification circuitry 208, or the like, for determining a non-veteran status for the user. In an instance in which no confirmatory veteran data instance is determined to be included in the user data, the veteran classification circuitry 208 may automatically determine a non-veteran status for the user. This may result in no veteran profile being generated for the user because the user was not confirmed to be a veteran.

In an instance in which it is determined that the user data includes a confirmatory veteran data instance, the process proceeds to operation 408. As shown by operation 408, the apparatus 200 includes means, such as processor 202, memory 204, veteran classification circuitry 208, or the like, for determining an affirmative veteran status for the user. Once the veteran classification circuitry 208 has determined a confirmatory veteran data instance, the veteran classification circuitry 208 may automatically determine an affirmative veteran status for the user.

In some embodiments, the veteran classification circuitry 208 may be configured with a status determination rule set that may include one or more rules that can be used to determine a particular type of affirmative veteran status (e.g., an "active-duty" status or "veteran" status) for the user based on the confirmatory veteran data instance(s). In some examples, the status determination rule set includes one or more rules for determining a veteran status based on time stamps associated with the confirmatory data instance. By way of example, if the veteran classification circuitry 208 identifies a most-recent confirmatory veteran data instance associated with a time stamp indicative that it was generated five years ago, the veteran classification circuitry 208 may determine a "veteran" status for the user. Alternatively, if the veteran classification circuitry 208 identifies a most-recent confirmatory veteran data instance associated with a time stamp indicative that it was generated five days ago, the veteran classification circuitry 208 may determine an "active-duty" status for the user. Additionally, the status determination rule set may include one or more rules for determining a veteran status based on the data type of the confirmatory data instance. For example, any DD form 214 may automatically result in a "veteran" status because this particular data instance is associated with a military discharge.

Optionally, as shown by operation 410, the apparatus 200 includes means, such as processor 202, memory 204, veteran classification circuitry 208, or the like, for determining whether the user data includes a particular confirmatory data instance. In some embodiments, the veteran classification circuitry 208 may further be configured to determine whether the user data includes a particular data instance for the user. In particular, the veteran classification circuitry 208 may be configured to determine whether the user data includes a DD form 214. The particular confirmatory data instance may be a data instance known to include accurate veteran attribute information. However, the particular confirmatory data instance may not be currently included in the user data.

In an instance in which the user data is determined to include the particular confirmatory data instance, the process proceeds to operation 304.

In an instance in which the particular confirmatory data instance is determined to be missing from the user data, the process proceeds to operation 412. Optionally, as shown by operation 412, the apparatus 200 includes means, such as processor 202, memory 204, communications hardware 206, veteran classification circuitry 208, or the like, for providing a limited power of attorney to the user. In an instance in which the user data does not include the particular confirmatory data instance (e.g., DD form 214), the veteran classification circuitry 208 may be configured to generate a limited power of attorney for the user to execute. The limited power of attorney document may include language authorizing the apparatus 200 and/or authorized users associated with the entity that operates apparatus 200 with the right to request, access, or otherwise receive a DD form 214. The veteran classification circuitry 208 may use a limited power of attorney template stored in an associated memory, such as memory 204, to generate the limited power of attorney for the user. In some embodiments, one or more limited power of attorney templates may be stored in memory and may correspond to different legal jurisdictions, such as states. The veteran classification circuitry 208 may determine the appropriate limited power of attorney template to select based on the user data in the user profile, such as the user's residential address.

The limited power of attorney template may include template language required by the particular jurisdiction to allow apparatus 200 to request, access, or otherwise receive a DD form 214 for the user. The limited power of attorney template may additionally include one or more blank fields that the veteran classification circuitry 208 may populate using information from the user data. For example, the one or more blank fields may require the veteran classification circuitry 208 to populate these fields with a user's legal name and address.

Once the veteran classification circuitry 208 generates the power of attorney, communications hardware 206 may provide a limited power of attorney request that includes the limited power of attorney to the user, such as via user device 106A-106N. The limited power of attorney request may request the user to execute the limited power of attorney by providing a signature and/or dating the limited power of attorney document at designated positions. In some embodiments, the limited power of attorney request may further include a time limit, such as one day, one week, two weeks, etc. The time limit may set a time window within which the user must sign the limited power of attorney or else the limited power of attorney is considered void and needs to be resent.

Optionally, as shown by operation 414, the apparatus 200 includes means, such as processor 202, memory 204, communications hardware 206, veteran classification circuitry 208, or the like, for determining whether the limited power of attorney was executed. The veteran classification circuitry 208 may determine whether the user executed the limited power of attorney within the time limit. If a user executes the limited power of attorney, the communications hardware 206 may receive a limited power of attorney response, which includes the executed limited power of attorney. Thus, the veteran classification circuitry 208 may determine the user executed the limited power of attorney during the time limit. If a user declines to execute the limited power of attorney, the communications hardware 206 may receive a limited power of attorney response indicating the user declined to execute the limited power of attorney and may additionally include reasons for the decline. Here, the veteran classification circuitry 208 may determine the user failed to execute the limited power of attorney during the time limit. If a user fails to either execute or decline to execute the limited power of attorney during the time window set by the time limit, the veteran classification circuitry 208 may automatically determine the user failed to execute the limited power of attorney during the time limit once the time window has passed.

In an instance in which the veteran classification circuitry 208 determines that the limited power of attorney was not executed, the process may proceed to operation 304.

In an instance in which the veteran classification circuitry 208 determines that the limited power of attorney was executed, the process may proceed to operation 416. Optionally, as shown by operation 416, the apparatus 200 includes means, such as processor 202, memory 204, communications hardware 206, veteran classification circuitry 208, or the like, for providing a data instance request to a third-party entity. The data instance request may include the executed limited power of attorney. The data instance request may further be indicative of a request for the particular confirmatory data instance (e.g., DD form 214) as well as corresponding user information (e.g., user's name, address, contact information, or the like) or other required information. The communications hardware 206 may provide the data instance request to a third party associated with the particular data instance. In particular, the communications hardware 206 may provide the data instance request to a third party such as the NPRC, such as via associated third-party devices 108A-108N.

Optionally, as shown by operation 418, the apparatus 200 includes means, such as processor 202, memory 204, communications hardware 206, veteran classification circuitry 208, or the like, for updating the user data to include the received data instance. In particular, the communications hardware 206 may receive the requested confirmatory data instance from a third-party entity (e.g., any one of third-party devices 108A-108N). The veteran classification circuitry 208 may then update the user data to include the received confirmatory data instance. This particular requested confirmatory data instance may aid with subsequent veteran attribute determinations as discussed below.

Returning now to FIG. 3A, as shown by operation 304, the apparatus 200 includes means, such as processor 202, memory 204, veteran classification circuitry 208, or the like, for determining whether the veteran status for the user is an affirmative veteran status. As described above, a veteran status may be determined for the user and the veteran status may be indicative of an affirmative veteran status (e.g., statuses of "active-duty," "veteran," "true," "1," or the like) or another non-affirmative veteran status (e.g., statuses of "non-veteran," "false," "0," or the like).

In an instance in which the veteran status for the user is not an affirmative veteran status (e.g., a non-veteran status), the process may proceed back to operation 302. As described above, the user may not be determined to be a veteran because they have not served in a branch of the military or because the identified user data pertaining to the user fails to contain a confirmatory veteran data instance. Thus, by returning to operation 302, veteran classification circuitry 208 may update a veteran status for the user periodically or semi-periodically, which may allow for the inclusion of new or updated user data.

In an instance in which the veteran status for the user is an affirmative veteran status, the process may proceed to operation 306. As shown by operation 306, the apparatus 200 includes means, such as processor 202, memory 204, communications hardware 206, veteran classification circuitry 208, or the like, for generating a veteran profile for the user. Once the veteran classification circuitry 208 has determined the user is associated with an affirmative veteran status, the veteran classification circuitry 208 may generate a veteran profile for the user. In some embodiments, the veteran classification circuitry 208 may be configured to use a template veteran profile, which may be stored and/or maintained in an associated memory, such as memory 204 or another storage repository. In some embodiments, the veteran profile for the user may be associated with a corresponding user profile. In some embodiments, the veteran profile may be a sub-profile of the user profile, such that the veteran attribute data fields of the veteran profile are included within the user profile for the user.

The template veteran profile may be indicative of the veteran attribute data fields to include within a veteran profile for the user. For example, veteran attribute data fields may include a service member name, service member date of birth, date of entry for active duty service, a date of exit for active duty service, a location for active duty service, service duty assignment, service duty geographical location, a service duty rank, a military job specialty, a military education, military honors, military badge, military citations, military campaign awards, number of years of service, a date of service entry, a date of service exit, a branch of the military, a veteran discharge status, a military base, a service number, and/or the like.

In some embodiments, the veteran classification circuitry 208 may determine one or more data values for one or more veteran attribute data fields within the veteran profile based on the user data and/or user profile. For example, the veteran classification circuitry 208 may determine a data value for the veteran attribute data field of service member name based on a user name user parameter included in the user profile. For veteran attribute data fields that the veteran classification circuitry 208 determines to not have a data corollary within the user profile, the veteran classification circuitry 208 may leave these data values with an unassigned status. An unassigned status may include an empty data value, a blank data value, a null data value, and/or the like.

As will be appreciated by one skilled in the art, although operations 308-318 describe operations with respect to a single veteran attribute data field, it will be appreciated that operations 308-318 may be repeated and/or performed simultaneously for multiple veteran attribute data fields. In particular, the assignment of data values associated with an unassigned for multiple veteran attribute data fields may be performed simultaneously, via parallel processing, such that data values may be assigned to these veteran attribute data fields in real time or near real time. Thus, this may allow users to realize the benefits they are eligible for in real time or near real time, and any perceived delay due to additional processes is mitigated. Additionally, simultaneous performance of the proactive operations may help avoid any benefit delays for users that are time sensitive.

As shown by operation 308, the apparatus 200 includes means, such as processor 202, memory 204, communications hardware 206, attribute identification circuitry 210, or the like, for identifying a veteran attribute data field with a data value associated with an unassigned status. The attribute identification circuitry 210 may identify a veteran attribute data field that is associated with an unassigned status (e.g., an empty data value, a blank data value, a null data value, and/or the like). The unassigned status may be indicative that a data value for this veteran attribute data field needs to be determined. Thus, the attribute identification circuitry 210 may first identify a veteran attribute data field with a data value associated with an unassigned status. For example, the veteran attribute data field may include a date of entry for active duty service, a date of exit for active duty service, a location for active duty service, service duty assignment, service duty geographical location, a service duty rank, a military job specialty, a military education, military honors, military badge, military citations, military campaign awards, number of years of service, a date of service entry, a date of service exit, a branch of the military, a veteran discharge status, a military base, or a service number.

As shown by operation 310, the apparatus 200 includes means, such as processor 202, memory 204, communications hardware 206, attribute identification circuitry 210, or the like, for generating a user input data set. The user input data set may include one or more data instances extracted from the user data associated with the user data. The data instances extracted from the user data may include data instances determined to be pertinent or relevant to the veteran attribute data field. As such, the data instances included in the user input data set may be curated and selected based on their relevance to the veteran attribute field type. This may allow the attribute identification circuitry 210 to selectively process certain, relevant data instances that may be a subset of the user data, thereby allowing for a reduction in the computational burdens associated with subsequent processing of the data instances while still maintaining overall data value accuracy by selecting relevant data instances.

In some embodiments, the attribute identification circuitry 210 may use a preprocessing model to generate the user input data set, as described in further detail below. In some embodiments, the preprocessing model may be a rules-based model configured to extract data instances from user data based on associated time stamps and/or a data requirement rule set. In effect, the preprocessing model may act as a filter for the data instances that are subsequently analyzed to determine a candidate data value and confidence score. Additionally, in some embodiments, the preprocessing model may be configured to remove duplicate data instances and/or transform the data into a desired format. For example, the preprocessing model may perform optical character recognition and/or natural language processing techniques on unstructured data instances to convert them to structured data instances. In some embodiments, the preprocessing model may further perform vectorization techniques (e.g., bag of words, term frequency-inverse document frequency, word2vec, global vectors, fastText, or the like) to transform information included in the data instance into one or more vectors, which may be provided as input to an attribute identification model.

In some embodiments, operation 310 may be performed in accordance with the operations described by FIG. 5. Turning now to FIG. 5, example operations are shown for generating a curated user input data set.

Optionally, as shown by operation 502, the apparatus 200 includes means, such as processor 202, memory 204, attribute identification circuitry 210, or the like, for determining an engaged duty time frame for the user. An engaged duty time frame may be a period of time during which the user was active within the military. In some embodiments, the engaged duty time frame includes a period directly before (e.g., two months) the user joined the military, the duration of the user's military involvement, and a period directly after (e.g., a month) the user was no longer in the military. Thus, the engaged duty time frame for the user may be a time frame during which he/she was involved with the military, and thus, associated user data occurring during this time may be indicative of said military involvement.

In some embodiments, the veteran profile of the user may have a data value currently assigned to veteran attribute data fields indicative of the time of military involvement for the user, such as a date of service entry, a date of service exit, a date of entry for active duty service, a date of exit for active duty service, number of years of service, or the like. In some embodiments, the attribute identification circuitry 210 may determine whether any one or more of these temporal veteran attribute data fields are associated with a data value and may further use one or more mathematical and/or logical operators to determine the engaged duty time frame of the user based on these values.

For example, a date of service entry and a date of service exit veteran attribute data fields may have the values of Oct.

29, 1990, and Nov. 1, 2000, respectively. The attribute identification circuitry 210 may be configured to determine the duration between the two dates and, additionally, the desired time period directly before the user's military involvement and the desired time period directly after the user's military involvement. By way of continuing example, the attribute identification circuitry 210 may be configured to determine the duration of the user's military involvement is 10 years and three days and, additionally, may be configured to determine two months as the desired time period directly before the user's military involvement and one month as the desired time period directly after the user's military involvement. Thus, the attribute identification circuitry 210 may determine the engaged duty time frame for the user from Aug. 29, 1990 through Dec. 1, 2000.

As another example, a date of service entry and a number of years of service veteran attribute data fields may have the values of Oct. 29, 1990, and 10 years and three days, respectively. The attribute identification circuitry 210 may be configured to determine the date of service exit based on these data values and, additionally, the desired time period directly before the user's military involvement and the desired time period directly after the user's military involvement. By way of continuing example, the attribute identification circuitry 210 may be configured to determine the user's date of service exit is Nov. 1, 2000, and, additionally, may be configured to determine two months as the desired time period directly before the user's military involvement and one month as the desired time period directly after the user's military involvement. Thus, the attribute identification circuitry 210 may determine the engaged duty time frame for the user from Aug. 29, 1990 through Dec. 1, 2000.

In an instance in which temporally indicative veteran attribute data fields do not have data values or only a limited number of veteran attribute data fields have data values, the attribute identification circuitry 210 may be unable to determine the engaged duty time frame for the user for the particular veteran attribute data field. Thus, in some embodiments, the attribute identification circuitry 210 may be configured to prioritize assignment of data values to temporally indicative veteran attribute data fields, such that the engaged duty time frame may be determined and used for data value determinations of subsequently determined veteran attribute data fields.

Optionally, as shown by operation 504, the apparatus 200 includes means, such as processor 202, memory 204, attribute identification circuitry 210, or the like, for determining qualifying data instances from user data associated with a time stamp that occurs within the engaged duty time frame. The attribute identification circuitry 210 may determine qualifying data instances from the user data by comparing the time stamp associated with a data instance in the user data. In an instance in which the time stamp, which may be indicative of when the data instance was generated, is determined to occur within the engaged duty time frame, the attribute identification circuitry 210 may determine this to be a qualifying data instance. In an instance in which the time stamp of the data instance is determined to occur outside the engaged duty time frame, the attribute identification circuitry 210 may ignore this data instance, such that it is not determined to be a qualifying data instance. In an instance in which an engaged duty time frame is determined for the user, the attribute identification circuitry 210 may filter data instances that are not associated with a time stamp within the engaged duty time frame. In this way, the attribute identification circuitry 210 may identify temporally relevant data instances pertaining to the user's time in the military and select these data instances as the qualifying data instances from the user data, thereby allowing for a reduction in the number of data instances used in subsequent processing and thus allowing for a reduction in the number of computational resources expended for processing.

As shown by operation 506, the apparatus 200 includes means, such as processor 202, memory 204, attribute identification circuitry 210, or the like, for restricting data instances of user data to the qualifying data instances. Once the attribute identification circuitry 210 has determined the qualifying data instances, the attribute identification circuitry 210 may restrict the data instances of the user data to only include the qualifying data instances. As such, the attribute identification circuitry 210 may ensure that only the qualifying data instances are considered in subsequent processing operations.

As shown by operation 508, the apparatus 200 includes means, such as processor 202, memory 204, communications hardware 206, attribute identification circuitry 210, or the like, for determining a data requirement rule set. In some embodiments, the attribute identification circuitry 210 may determine a data requirement rule set that includes one or more rules. The one or more rules may be indicative of one or more data types and/or one or more data sources inferred to be relevant to particular veteran attribute data fields. For example, a rule in the data requirement rule set may be indicative that for a number of years of service veteran attribute data field, relevant data instances include a received payment data type indicative of a DFAS data source, a government document data type (e.g., a DD form 214, a DD form 220, or the like), and/or transaction data types.

In some embodiments, the attribute identification circuitry 210 may be configured to generate and manage the data requirement rule set. In particular, in some embodiments, the attribute identification circuitry 210 may be configured to use the preprocessing model to generate and manage the data requirement rule set. In some embodiments, the preprocessing model may be configured to receive one or more indications pertaining to the weighting of data types and/or data sources as determined by an attribute identification model, as described in further detail below. For example, during a training routine, the attribute identification model may be configured to determine weights for certain data types and/or data sources based on an inferred relevance of the data type and/or data source to a particular veteran attribute data field of interest. Once the training routine is complete, the attribute identification model may provide the indications of the weights determined for different data types and/or data sources during training to the preprocessing model. The preprocessing model may be configured to use these provided indications to generate one or more rules for the veteran attribute data field. For example, the indications of weighting may be associated with an assigned numerical weight for a particular data type and/or data source. The preprocessing model may be configured to select a number n data types and/or data sources associated with the most relevant weights and generate a rule describing that a data instance must correspond to one of the n data types and/or data sources. As another example, the preprocessing model may be configured to determine whether a weight associated with a data type and/or data source satisfies a weight threshold. In an instance in which the weight satisfies the weight threshold, the preprocessing model may be configured to generate a rule indicative that a data instance that may correspond to the data type and/or data source for a given veteran attribute data field.

In some embodiments, the preprocessing model may be configured to update and/or modify the data requirement rule set based on additional indications pertaining to weighting of the data types and/or data sources provided by the attribute identification model. This may occur when the attribute identification model is retrained such that weights are adjusted.

As shown by operation 510, the apparatus 200 includes means, such as processor 202, memory 204, attribute identification circuitry 210, or the like, for extracting data instances from the user data that satisfy the one or more rules of the data requirement set to generate the user input data set. Once the attribute identification circuitry 210 has determined the data requirement rule set, the attribute identification circuitry 210 may extract qualifying data instances from the user data in an instance in which a qualifying data instance satisfies the one or more rules of the data requirement set. In particular, the attribute identification circuitry 210 may use the preprocessing model to extract the qualifying data instances and generate the user input data set.

The preprocessing model may identify one or more rules within the data requirement rule set that pertain to the veteran attribute data field of interest. The one or more rules may be indicative of one or more data types and/or one or more data sources inferred to be relevant to said veteran attribute data field. The preprocessing model may then process the data instances from the user data, which may have been restricted to include one qualifying data instance associated with a time stamp that occurred within the engaged duty time frame. The preprocessing model may process these data instances to identify whether the data instance is associated with either a data type and/or data source indicated as relevant by the data requirement rule set. In an instance in which the preprocessing model identifies a data instance that satisfies the one or more rules pertaining to the veteran attribute data field, the preprocessing model may extract the data instance and append it to the user input data set. As such, the user input data set generated by the preprocessing model may include only data instances determined to be relevant to the veteran attribute data field. Thus, this may limit the number of data instances processed by the attribute identification model, thereby maintaining accuracy while reducing the expenditure of required computational resources.

Turning now to FIG. 3B, as shown by operation 312, the apparatus 200 includes means, such as processor 202, memory 204, communications hardware 206, attribute identification circuitry 210, or the like, for determining a candidate data value for the veteran attribute data field and a confidence score. Once the attribute identification circuitry 210 has generated the user input data set using the preprocessing model, the attribute identification circuitry 210 may use an attribute identification model to process the user input data set and generate a candidate data value and a confidence score.

The attribute identification model may be a machine-learning model that is trained to infer candidate data values for particular veteran attribute data fields. In some embodiments, the attribute identification model may be a neural network, such as a convolutional neural network, recurrent neural network (e.g., a long short-term memory model), a transformer model (e.g., bidirectional encoder representations from transformers), a deep neural network, or the like. A training routine may be applied to train the attribute identification model. For example, training data may include training data sets that include training data instances and are labeled with an indication of whether a corresponding user is associated with an affirmative veteran status and, additionally, may include a ground-truth data value for a veteran attribute data field of interest. For example, for a branch of the military veteran attribute data field, a training data set may include a plurality of data instances of various data types and/or data sources and may further be associated with an indication of whether the user is associated with an affirmative veteran status (e.g., statuses of "active-duty," "veteran," "true," "1," or the like for an affirmative veteran status or the like) and further, a branch of the military (e.g., Army, Navy, Air Force, Marines, Coast Guard, National Guard, or the like). The training data sets may include users associated with an affirmative veteran status and users not associated with an affirmative veteran status, which may serve as a control group. The attribute identification model may be configured to use various pattern recognition techniques, such as clustering (e.g., k-means clustering, density-based spatial clustering of applications with noise, fuzzy clustering, or the like), to identify patterns within the data instances for users with like data values for the veteran attribute data field of interest. For example, the attribute identification model may be configured to cluster users associated with an affirmative veteran status and a data value of "Navy" for the branch of the military veteran attribute data field. The attribute identification model may then identify patterns or common features within the data instances. By way of particular example, the attribute identification model may identify a subset of the users of the aforementioned cluster of users associated with the data value of "Navy" for the branch of the military veteran attribute data field associated with data instances that are associated with a transaction data type associated with a Naval Submarine Base New London data source. Thus, the attribute identification model may be configured to determine that transaction data types associated with the Naval Submarine Base New London data source are indicative that the user is associated with a data value of "Navy" for the branch of the military veteran attribute data field. The attribute identification model may assign weights to different data types, data sources, and/or combinations thereof depending on the inferred correlation between the data type and/or data source with the ground truth value for the veteran attribute data field.

Additionally, the attribute identification model may consider the quantity of similar data types and/or data sources within a training data set (e.g., multiple data instances associated with transaction data types associated with the Naval Submarine Base New London data source) and/or among other training data sets (e.g., multiple occurrences of a training data set including a transaction data type associated with the Naval Submarine Base New London data source). Furthermore, the attribute identification model may be configured to identify whether the data type and/or data source occurs within other non-relevant clusters of users (e.g., users associated with an affirmative veteran status but not associated with a data value of "Navy" or users who are not associated with an affirmative veteran status). In an instance in which the data type and/or data source occurs within other clusters of users, the attribute identification model may adjust the inferred weight of the data type and/or data source accordingly because it is not unique to the particular user cluster of interest.

The attribute identification model may assign weights to the data type and/or data source based on the above. The assigned weight may be indicative of an inferred correlation or relevance between the data type and/or data source and the veteran attribute data field and may be represented as a numerical value. For example, an assigned weight may be a numerical value between 0 and 1, where 0 is indicative of no correlation between the data type and/or data source with the veteran attribute data field and 1 is indicative of absolute correlation between the data type and/or data source with the veteran attribute data field.

As described previously, the attribute identification model may be configured to provide indications pertaining to the weighting of data types and/or data sources to the preprocessing model. In particular, in some embodiments, the attribute identification model may be configured to provide the preprocessing model with the weights inferred for each data type, data source, and/or combination thereof. Thus, the preprocessing model may use this information to generate the data requirement rule set used to generate the user input data set.

Once the attribute identification model has been trained or retrained, the attribute identification model may receive the user input data set provided by the preprocessing model as well as an indication of the veteran attribute data field of interest. Thus, the attribute identification model may be configured to identify the appropriate weights associated with the veteran data field. The received user input data set may include one or more data instances, each corresponding to a particular data type and/or data source. The attribute identification model may be configured to process the data instances, identify the corresponding data type and/or data source, apply the appropriate weights to each data instance associated with the veteran attribute data field, determine a candidate data value for the veteran attribute, and further determine a confidence score associated with the candidate data value. By way of continuing example, if the veteran attribute data field of interest is a branch of the military veteran attribute data field and the user input data set includes 100 data instances that are associated with a transaction data type associated with a Naval Submarine Base New London data source, the attribute identification model may determine a candidate data value of "Navy" for the branch of the military veteran attribute data field. The confidence score may be indicative of the likelihood that the candidate data value is correctly inferred. In some embodiments, the attribute identification model may determine an intermediate candidate data value for each data type and/or data source. In some embodiments, the attribute identification model may then determine the intermediate candidate data value that occurred the most frequently as well as the weights associated with the associated with the data type and/or data source. The attribute identification model may then compare all intermediate candidate data values and select the intermediate candidate data value using suitable techniques (e.g., logistic regression, classification analyses). Additionally, the attribute identification model may determine the confidence score for the candidate data model based on intermediate candidate data values identified. For example, if only one intermediate candidate data value was identified from several data instances, the confidence score may indicate a higher confidence as compared to an instance in which multiple different candidate data values were identified from the same number of data instances.

In some embodiments, the attribute identification model may determine the confidence score based on the quantity of relevant data types and/or data sources, the weights associated with the data types and/or data sources, and/or the like. The attribute identification model may determine the confidence score using any suitable method, such as using a softmax activation function, a sigmoid activation function, stochastic techniques, or other probabilistic functions.

In some embodiments, for certain veteran attribute data fields, the number of classifications may be limited such that the number of candidate data values may be defined for the veteran attribute data field. For example, the branch of the military veteran attribute data field may have a defined and limited number of candidate data values such that the attribute identification model may determine a candidate data value for the veteran attribute data field that corresponds to one of the defined candidate data values based on the user input data set.

Alternatively, other veteran attribute data fields may be continuous or not definite, such that the candidate data values cannot be limited to a reasonable number. In some embodiments, determination of a candidate data value for a veteran attribute data field that is continuous may require the attribute identification model to perform mathematical and/or logical operators to determine a candidate date value. For example, for a number of years of service veteran attribute data field, the attribute identification model may use the date of service entry and date of service exit included in a DD form 214 data type and perform mathematical operations to determine the number of years of service based on the date of service entry data value and date of service entry data value. As another example, the attribute identification model may infer a date of service entry based on a first occurring transaction data type from a military base data source and infer a date of service exit based on a last occurring transaction data type from a military base data source and perform mathematical operations to determine the number of years of service. In some embodiments, the attribute identification model may determine intermediate candidate data value using both methods and may compare the intermediate candidate data values to determine how closely the data values match. In some embodiments, the attribute identification model may perform logistic regression that considers the intermediate candidate data values and weights associated with the corresponding data type and/or data source associated with the intermediate candidate data value to determine a candidate data value and associated confidence score. In some embodiments, other assigned data values of veteran attribute data fields in the veteran profile may additionally be considered when determining the confidence score. By way of continuing example, in an instance in which the veteran attribute data fields of date of service entry and date of service entry are associated with data values, the attribute identification model may perform mathematical operations to determine the number of years of service based on these values and compare with the intermediate candidate data values.

Figure 7:
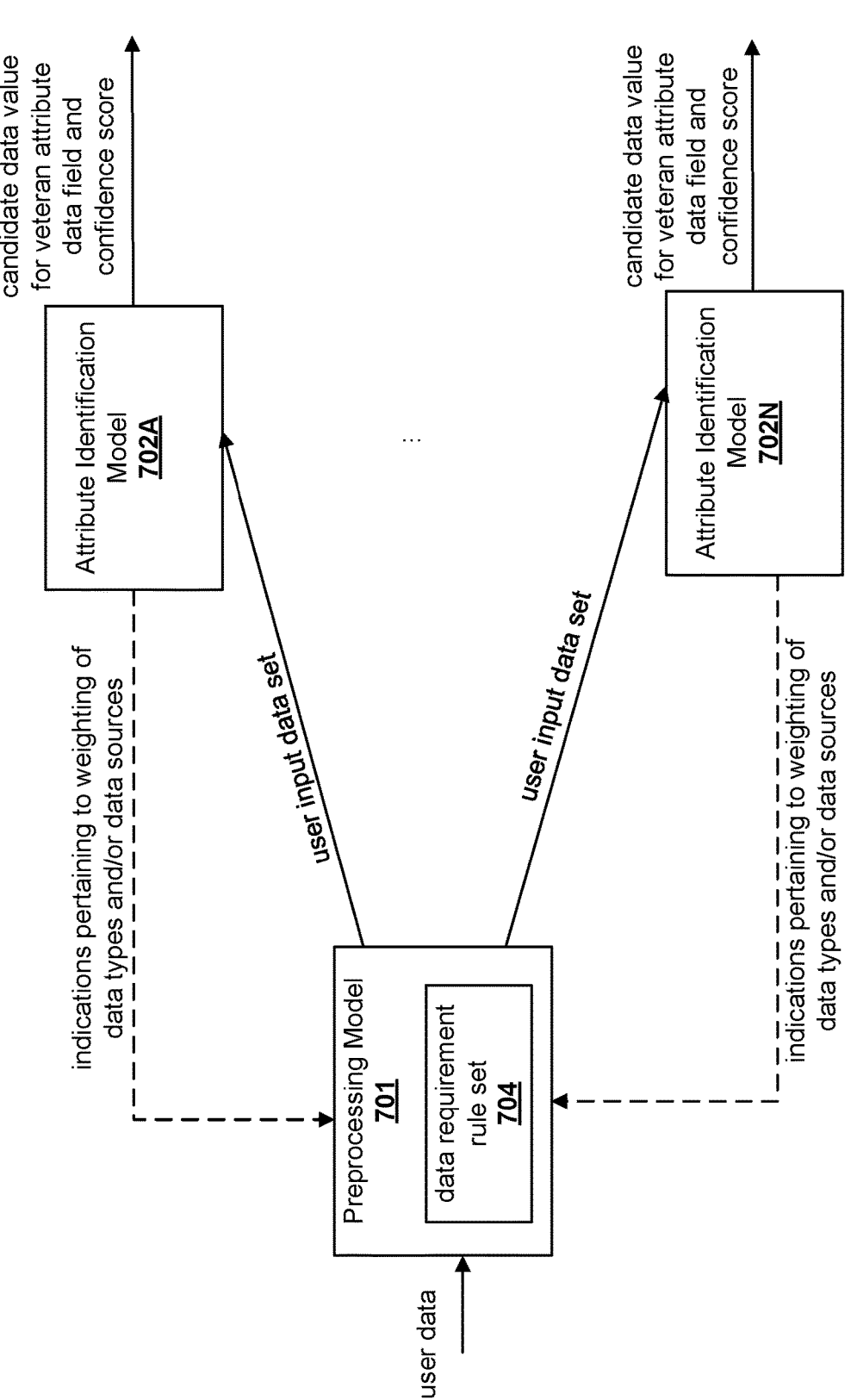
FIG. 7 illustrates an example model architecture that includes the preprocessing model and attribute identification model as used in some example embodiments described herein.

Turning now to FIG. 7, an example model architecture is shown. As shown in FIG. 7, the model framework may include a preprocessing model 701 that may be configured to receive user data pertaining to the user. For each veteran attribute data field, the preprocessing model may apply the data requirement rule set 704 to generate the user input data set. In some embodiments, multiple attribute identification models (e.g., attribute identification model 702A through attribute identification model 702N) may be associated with the preprocessing model 701. In some embodiments, each attribute identification model may be associated with a particular veteran attribute data field, such that the attribute identification model may be trained to determine a candidate data value for the particular veteran attribute data field as well as the confidence score for the candidate data value. The attribute identification models 702A-702N may be configured to provide indications pertaining to the weighting of the data types and/or data sources inferred to be relevant for the particular veteran attribute data field back to the preprocessing model 701. This may allow the preprocessing model 701 to generate the data requirement rule set. The preprocessing model 701 may determine the attribute identification model to provide the user input data set based on the veteran attribute data field of interest and the veteran attribute data field associated with each attribute identification model 702A-702N. The recipient attribute identification model (e.g., any one of attribute identification model 702A-702N) may process the user input data set and output the candidate data value and associated confidence score.

Returning to FIG. 3B, as shown by operation 314, the apparatus 200 includes means, such as processor 202, memory 204, communications hardware 206, attribute identification circuitry 210, or the like, for adjusting a confidence score threshold. In some embodiments, the confidence score threshold between different veteran attribute data fields may correspond to a different value. The confidence score threshold may control the sensitivity of assignments of data values to the particular veteran attribute data field. In some embodiments, the attribute identification circuitry 210 may be configured to adjust the confidence score threshold based on the particular veteran attribute data field of interest. In some embodiments, the attribute identification circuitry 210 may be configured with a set of predefined confidence score thresholds for each veteran attribute data field. In some embodiments, the predefined confidence score thresholds may be manually configured by an authorized user. Alternatively, the predefined confidence score thresholds may be automatically determined by the attribute identification circuitry 210 based on an inferred importance of the data value for the veteran attribute data field. For example, a date of service entry and date of service exit veteran attribute data fields may serve additional purposes once determined (e.g., determining an engaged duty time frame, serving as confirmatory data values for other temporally associated veteran attribute data fields, and the like). Thus, the confidence score threshold for the date of service entry and date of service exit may be adjusted to require a better performing confidence score for a candidate data value to satisfy the confidence score threshold.

As shown by operation 316, the apparatus 200 includes means, such as processor 202, memory 204, communications hardware 206, attribute identification circuitry 210, or the like, for determining whether the confidence score for the candidate data value satisfies the confidence score threshold. Once the attribute identification circuitry 210 adjusts the confidence score threshold, the attribute identification circuitry 210 may determine whether the confidence score associated with the candidate data value satisfies the confidence score threshold. For example, a confidence score threshold for a branch of the military veteran attribute data field may require a confidence score of 0.7 or higher. Thus, a candidate data value associated with a confidence score of 0.7 or higher may be determined to satisfy the confidence score threshold. Otherwise, the candidate data value fails to satisfy the confidence score threshold.

In an instance in which the attribute identification circuitry 210 determines the confidence score for the candidate data value fails to satisfy the confidence score threshold, the process proceeds back to operation 312. In this case, the candidate data value may be associated with an insufficient confidence score indicative that there is insufficient support to determine this candidate data value for the user. Thus, by returning to operation 312, the attribute identification circuitry 210 may determine another candidate data value for the veteran attribute data field and a confidence score. In some instances, if the confidence score for the candidate data value fails to satisfy the confidence score threshold, the user input data set may be modified to include previously excluded additional data instances associated with time stamps that occur outside the engaged duty time frame and/or fail to satisfy one or more of the rules of the data requirement rule set. In particular, the attribute identification circuitry 210 may expand the engaged duty time frame and/or ignore one or more rules of the data requirement rule set to allow for the inclusion of previously excluded data instances. In this way, the attribute identification circuitry 210 may attempt to increase the robustness of the data in an iterative manner that is considerate of computational resource expenditure.

In an instance in which the attribute identification circuitry 210 determines the confidence score for the candidate data value satisfies the confidence score threshold, the process proceeds to operation 318. As shown by operation 318, the apparatus 200 includes means, such as processor 202, memory 204, attribute identification circuitry 210, or the like, for updating the veteran profile with the candidate data value as the data value for the veteran attribute data field. In an instance in which the attribute identification circuitry 210 determines the confidence score associated with the candidate data value satisfies the confidence score threshold, this may be indicative that the candidate data value is associated with sufficient confidence required to update the corresponding veteran attribute data field. The attribute identification circuitry 210 may therefore update the previously unassigned data value for the veteran attribute data field to the candidate data field. Thus, the veteran attribute data field included in the veteran profile may be updated to reflect a data value determined for the user based on associated user data. The updated veteran profile may be securely stored in an associated memory, such as memory 204 or another data repository.

As shown by operation 320, the apparatus 200 includes means, such as processor 202, memory 204, proactive action circuitry 212, or the like, for detecting a trigger event. In some embodiments, the proactive action circuitry 212 may be configured to monitor for certain trigger events. A trigger event may be an occurrence or situation of interest determined to be pertinent or relevant to the user. In some embodiments, the proactive action circuitry 212 may determine relevant trigger events for the user based on the veteran profile associated with the user. For example, a trigger event may correspond to a military event (e.g., Veterans Day), a branch-specific military event (e.g., the Navy's birthday), a user-specific military event (e.g., the anniversary of when the user entered or exited the military), and/or the like. The proactive action circuitry 212 may be configured to analyze the veteran profile of the user to identify relevant trigger events for the user. By way of example, the proactive action circuitry 212 may be configured to analyze the veteran profile to identify a data value for the branch of the military veteran attribute data field, which may be "Navy." The proactive action circuitry 212 may then be configured to identify the Navy's birthday of October 13 as a trigger event for the user.

Once the proactive action circuitry 212 has determined relevant trigger events for the user, the proactive action circuitry 212 may monitor for the occurrence of the trigger event and may detect the trigger event based on user data and/or other data. By way of continuing example, the proactive action circuitry 212 may determine a current date of Oct. 13, 2023, which may correspond to the Navy's birthday, which is a trigger event for the user.

As shown by operation 322, the apparatus 200 includes means, such as processor 202, memory 204, proactive action circuitry 212, or the like, for generating a tailored user message. In some embodiments, the proactive action circuitry 212 may generate the tailored user message in response to detection of the trigger event. For example, the proactive action circuitry 212 may generate the tailored user message in response to the occurrence of the Oct. 13, 2023 date. The tailored user recommendation may be indicative of one or more data values included in the user profile. In some embodiments, the tailored user recommendation may further include one or more user interaction elements that allow a user to interact with a particular determined data value for a veteran attribute data field and confirm or deny whether a data value is correct or incorrect. In this way, the accuracy of the veteran profile for the user may be ensured, and further, the feedback for each veteran attribute data field may serve as reinforcement that can be used to further refine the attribute identification models.

In some embodiments, the proactive action circuitry 212 may use a message generation model to generate the tailored user message or a portion of the tailored user message. In some embodiments, the message generation model may be a large language model configured to generate text explanatory of the occurrence of the trigger event and its relevance to the user. The message generation model may further include the data values associated with veteran attribute data fields determined to be relevant to the detection of the trigger event in generating text, images, or other content included in the tailored user message. For example, in response to the detection of a trigger event associated with the U.S. Navy's birthday, the message generation model may include the current date and the text of "Did you know the U.S. Navy was founded on Oct. 13, 1775? To celebrate this occasion and to thank you for your 10 years of service in the U.S. Navy, please accept our below offers." Thus, the content of the tailored user message may provide an explanation of the relevance of the message to the user and may further include content tailored to the user based on the user's associated veteran profile.

In some embodiments, the tailored user recommendation may further include one or more financial product recommendations that include an offer for the user for a financial product subject to particular conditions. For example, a financial product recommendation may be a car loan offer, mortgage offer, refinancing offer, or other offer with a particular loan amount, rate, loan term, etc. In some embodiments, the proactive action circuitry 212 may use a user profile analysis model to generate the one or more financial product recommendations.

The user profile analysis model may be a rules-based model or machine-learning model, such as a neural network, that is configured to analyze a user profile and identify one or more areas of need for the user. In some embodiments, the user profile analysis model may further be configured to contemplate needs of a recently returning veteran service member, whose needs may be different from an average user. For example, a service member may have sold assets due to his/her military service. Thus, the user profile analysis model may analyze historical user behavior and/or assets to identify sold assets, such as cars, houses, etc., or cancelled assets, such as house leases, car leases, etc., and may provide the user with one or more financial product recommendations to regain these assets or arrangements within fiscally responsible boundaries. By way of particular example, if the user profile analysis model determines the user sold his/her car prior to deployment, the user profile analysis model may generate a financial product recommendation that offers a new car loan, such that the user may purchase a new vehicle. The amount offered by the car loan may be determined by the user profile analysis model based on the user profile information and, in some embodiments, historical car payments by the user. As such, the user profile analysis model may provide financial product recommendations that address an inferred need of the returning service member in a budget-friendly manner. The offered financial product recommendations may also be discounted or with more limited restrictions than an average offered financial product in recognition of the user's service and in celebration of the corresponding trigger event (e.g., Navy's birthday, user's service start date, user's service end date, or the like).

As shown by operation 324, the apparatus 200 includes means, such as processor 202, memory 204, communications hardware 206, proactive action circuitry 212, or the like, for providing the tailored user message. Once the proactive action circuitry 212 has generated the tailored user message, communications hardware 206 may provide the tailored user message to the user. In particular, the communications hardware 206 may provide the tailored user message to any one or more of user devices 106A-106N. In some embodiments, the communications hardware 206 may determine user devices 106A-106N using a user profile associated with the user. The user profile may pertain to the particular user and include associated user devices (e.g., user devices 106A-106N) and device information, such as phone numbers, identification numbers, serial numbers, international mobile equipment identity numbers, etc.

In some embodiments, the user may interact with one or more user interaction elements to provide feedback regarding data values for one or more veteran attribute data fields. The communications hardware 206 may receive this feedback and the proactive action circuitry 212 may update the veteran profile associated with the user accordingly and may log the feedback received from the user. In particular, in an instance the user marks a data value as correct, the veteran profile may be updated to indicate this confirmation. In an instance the user marks the data value as incorrect, the veteran profile may be updated to remove this incorrect data value. In some embodiments, the user may provide the correct data value for the veteran attribute data field such that the proactive action circuitry 212 may update the data value based on the received correct data value.

Figure 6:
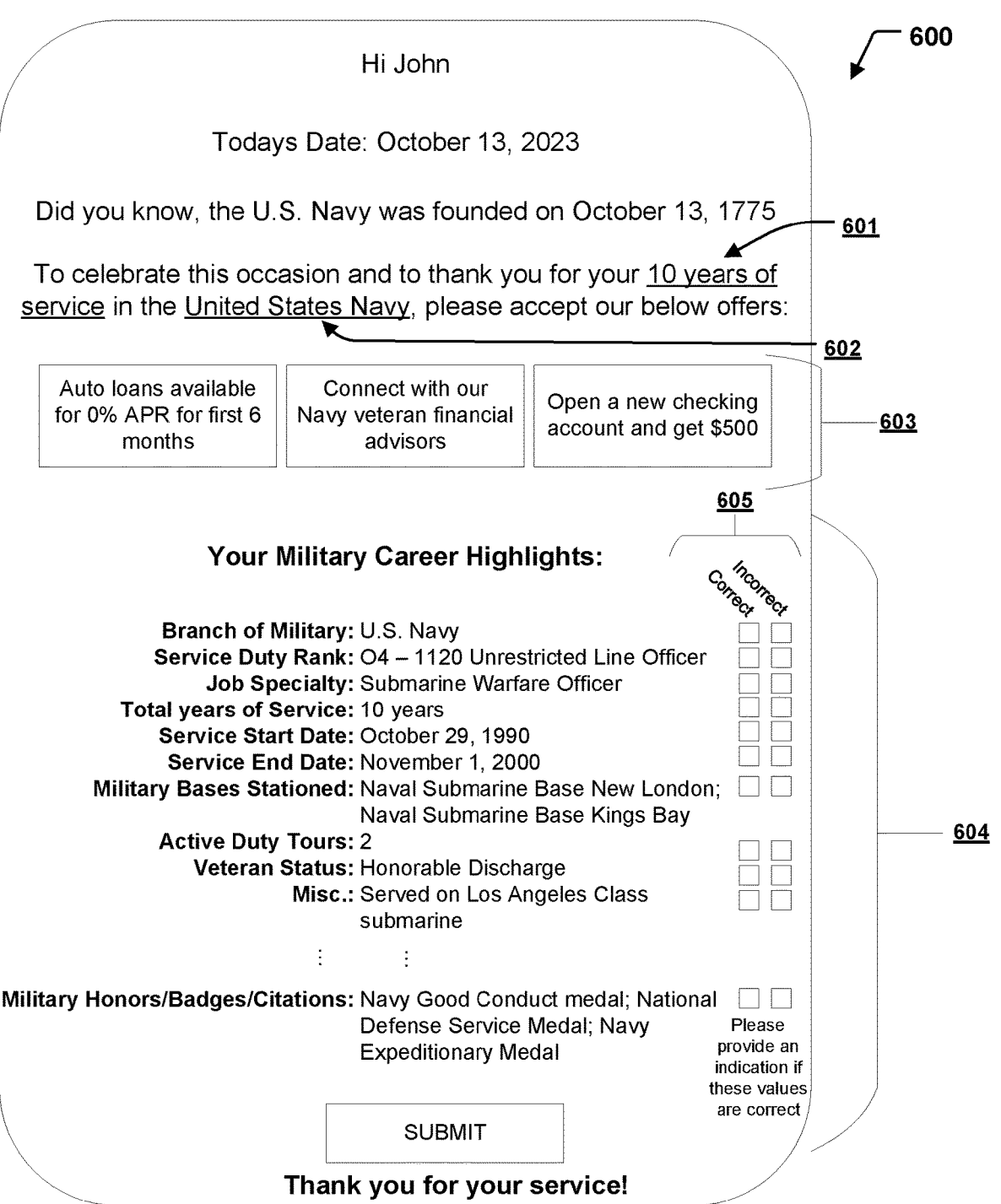
FIG. 6 illustrates an example user interface illustrating a tailored user recommendation used in some example embodiments described herein.

Turning to FIG. 6, a GUI is provided that illustrates an example tailored user recommendation. As noted previously, a user may interact with the veteran analysis system 102 by directly engaging with communications hardware 206 of an apparatus 200 comprising a system device of the veteran analysis system 102. In such an embodiment, the GUI shown in FIG. 6 may be displayed to a user by the apparatus 200. Alternatively, a user may interact with the veteran analysis system 102 using a separate user device (e.g., any of user devices 106A-106N, as shown in FIG. 1), which may communicate with the veteran analysis system 102 via communications network 104. In such an embodiment, the GUI shown in FIG. 6 may be displayed to the user by the user device.

As shown in FIG. 6, the tailored user recommendation may include data values for various veteran attribute data fields included in the veteran profile of the user 601, 602, and 604. Additionally, the tailored user recommendation may include one or more financial product recommendations 603. Furthermore, the tailored user recommendation may include user interaction elements 605, which a user may interact with (e.g., click, touch, select, audibly request, or the like) to either confirm or deny a particular data value for a veteran attribute data field.

FIGS. 3A-5 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special-purpose hardware-based computing devices that perform the specified functions or combinations of special-purpose hardware and software instructions.

CONCLUSION

As described above, example embodiments provide methods and apparatuses that enable the ability to generate and maintain an accurate veteran profile for the user that includes data values for various veteran attribute data fields. Example embodiments thus provide a time- and resource-efficient solution to identification of veteran-specific user attributes. This automated solution allows for the automatic determination of veteran attributes for a user. An attribute identification model may be trained to automatically infer data types and/or data sources that are indicative of data values for a veteran attribute data field. By additionally determining confidence scores for candidate data values and further adjusting a confidence score threshold based on a veteran attribute data field, the integrity and accuracy of the veteran profile may be maintained. Thus, in contrast to conventional systems that require the user to manually inform an entity of such attributes, example embodiments allow for these attributes to be automatically inferred based on associated user data, thereby lessening the manual burden on the user.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for automatically updating a veteran profile for a user, the method comprising:

identifying, by attribute identification circuitry, a veteran attribute data field with a data value associated with an unassigned status within the veteran profile of the user;

identifying, by veteran classification circuitry, a plurality of data instances for the user, wherein (a) each data instance is associated with a data source, (b) the data source is at least one of a Department of Defense data source, a Defense Finance Accounting Service data source, a Veteran Affairs data source, a National Personnel Records Center data source, or a military-affiliate data source, and (c) each data instance is associated with a corresponding time stamp;

determining, by the attribute identification circuitry, an engaged duty time frame for the user based on at least one of (a) service entry date, (b) a service exit date, (c) an active duty service entry date, (d) an active duty service exit date, and (e) a duration of service, wherein the engaged duty time frame represents a time period of military involvement of the user;

determining, by the attribute identification circuitry, whether a time stamp associated with a data instance of the plurality of data instances occurs within the engaged duty time frame;

in response to determining that the time stamp associated with the data instance occurs within the engaged duty time frame, determining, by the attribute identification circuitry, that the data instance is a qualifying data instance;

generating, by the attribute identification circuitry and using a preprocessing model, a user input data set, wherein the user input data set includes only the qualifying data instance;

determining, by the attribute identification circuitry and using an attribute identification model, (a) a candidate data value for the veteran attribute data field based on the user input data set, and (b) a confidence score for the candidate data value, wherein the confidence score is determined based on the data source associated with the qualifying data instance;

in an instance in which the confidence score satisfies a confidence score threshold, updating, by the attribute identification circuitry, the veteran profile with the candidate data value as the data value for the veteran attribute data field;

generating, by proactive action circuitry and based on the veteran profile, a tailored user recommendation, wherein the tailored user recommendation is indicative of one or more data values included in the veteran profile; and providing, by communications hardware and in real-time, the tailored user recommendation.

2. The method of claim 1, further comprising:

determining, by the veteran classification circuitry, a veteran status for the user; and in an instance in which the veteran status is affirmative, generating, by the veteran classification circuitry, the veteran profile for the user.

3. The method of claim 2, further comprising:

determining, by the veteran classification circuitry and using a veteran status classification model, whether a confirmatory veteran data instance is included in user data, wherein the confirmatory veteran data instance is identified based on at least one of an associated data type or an associated data source; and in an instance in which it is determined that the user data includes the confirmatory veteran data instance, determining, by the veteran classification circuitry, an affirmative veteran status for the user.

4. The method of claim 1, further comprising:

determining, by the attribute identification circuitry and using the preprocessing model, a data requirement rule set, wherein the data requirement rule set comprises one or more rules indicative of at least one of one or more data types or one or more data sources inferred to be relevant to the veteran attribute data field, wherein the qualifying data instance is determined in response to determining that the data instance satisfies the one or more rules.

5. The method of claim 1, further comprising detecting, by the proactive action circuitry and based on the veteran profile, a trigger event, wherein (a) the trigger event is associated with a data value for the veteran attribute data field, and (b) the tailored user recommendation is generated in response to detection of the trigger event.

6. The method of claim 1, further comprising adjusting, by the attribute identification circuitry, the confidence score threshold based on the veteran attribute data field.

7. The method of claim 1, wherein the veteran attribute data field comprises the active duty service entry date, the active duty service exit date, a location for active duty service, service duty assignment, service duty geographical location, a service duty rank, a military job specialty, a military education, military honors, military badge, military citations, military campaign awards, number of years of service, the service entry date, the service exit date, a branch of the military, a veteran discharge status, a military base, or a service number.

8. An apparatus for automatically updating a veteran profile for a user, the apparatus comprising:

attribute identification circuitry configured to:

identify a veteran attribute data field with a data value associated with an unassigned status within the veteran profile of the user;

veteran classification circuitry configured to identify a plurality of data instances for the user, wherein (a) each data instance is associated with a data source, (b) the data source is at least one of a Department of Defense data source, a Defense Finance Accounting Service data source, a Veteran Affairs data source, a National Personnel Records Center data source, or a military-affiliate data source, and (c) each data instance is associated with a corresponding time stamp;

wherein the attribute identification circuitry is further configured to:

determine an engaged duty time frame for the user based on at least one of (a) service entry date, (b) a service exit date, (c) an active duty service entry date, (d) an active duty service exit date, and (e) a duration of service, wherein the engaged duty time frame represents a time period of military involvement of the user, determine whether a time stamp associated with a data instance of the plurality of data instances occurs within the engaged duty time frame, in response to determining that the time stamp associated with the data instance occurs within the engaged duty time frame, determine that the data instance is a qualifying data instance, generate, using a preprocessing model, a user input data set, wherein the user input data set includes only the qualifying data instance, determine, using an attribute identification model, (a) a candidate data value for the veteran attribute data field based on the user input data set, and (b) a confidence score for the candidate data value, wherein the confidence score is determined based on the data source associated with the qualifying data instance, and in an instance in which the confidence score satisfies a confidence score threshold, update the veteran profile with the candidate data value as the data value for the veteran attribute data field;

proactive action circuitry configured to generate, based on the veteran profile, a tailored user recommendation, wherein the tailored user recommendation is indicative of one or more data values included in the veteran profile; and communications hardware configured to provide, in real-time, the tailored user recommendation.

9. The apparatus of claim 8, wherein the veteran classification circuitry is further configured to:

determine a veteran status for the user; and in an instance in which the veteran status is affirmative, generate the veteran profile for the user.

10. The apparatus of claim 9, wherein the veteran classification circuitry is further configured to:

determine, using a veteran status classification model, whether a confirmatory veteran data instance is included in user data, wherein the confirmatory veteran data instance is identified based on at least one of an associated data type or an associated data source; and in an instance in which it is determined that the user data includes the confirmatory veteran data instance, determine an affirmative veteran status for the user.

11. The apparatus of claim 8, wherein the attribute identification circuitry is further configured to:

determine, using the preprocessing model, a data requirement rule set, wherein the data requirement rule set comprises one or more rules indicative of at least one of one or more data types or one or more data sources inferred to be relevant to the veteran attribute data field, wherein the qualifying data instance is determined in response to determining that the data instance satisfies the one or more rules.

12. The apparatus of claim 8, wherein the proactive action circuitry is further configured to detect, based on the veteran profile, a trigger event, wherein (a) the trigger event is associated with a data value for the veteran attribute data field, and (b) the tailored user recommendation is generated in response to detection of the trigger event.

13. The apparatus of claim 8, wherein the attribute identification circuitry is further configured to adjust the confidence score threshold based on the veteran attribute data field.

14. The apparatus of claim 8, wherein the veteran attribute data field comprises the active duty service entry date, the active duty service exit date, a location for active duty service, service duty assignment, service duty geographical location, a service duty rank, a military job specialty, a military education, military honors, military badge, military citations, military campaign awards, number of years of service, the service entry date, the service exit date, a branch of the military, a veteran discharge status, a military base, or a service number.

15. A computer program product for automatically updating a veteran profile for a user, the computer program product comprising at least one non-transitory computer-readable storage medium storing software instructions that, when executed, cause an apparatus to:

identify a veteran attribute data field with a data value associated with an unassigned status within the veteran profile of the user;

identify a plurality of data instances for the user, wherein (a) each data instance is associated with a data source, (b) the data source is at least one of a Department of Defense data source, a Defense Finance Accounting Service data source, a Veteran Affairs data source, a National Personnel Records Center data source, or a military-affiliate data source, and (c) each data instance is associated with a corresponding time stamp;

determine an engaged duty time frame for the user based on at least one of (a) service entry date, (b) a service exit date, (c) an active duty service entry date, (d) an active duty service exit date, and (e) a duration of service, wherein the engaged duty time frame represents a time period of military involvement of the user;

determine whether a time stamp associated with a data instance of the plurality of data instances occurs within the engaged duty time frame;

in response to determining that the time stamp associated with the data instance occurs within the engaged duty time frame, determine that the data instance is a qualifying data instance;

generate, using a preprocessing model, a user input data set, wherein the user input data set includes only the qualifying data instance;

determine, using an attribute identification model, (a) a candidate data value for the veteran attribute data field based on the user input data set, and (b) a confidence score for the candidate data value, wherein the confidence score is determined based on the data source associated with the qualifying data instance;

in an instance in which the confidence score satisfies a confidence score threshold, update the veteran profile with the candidate data value as the data value for the veteran attribute data field;

generate, based on the veteran profile, a tailored user recommendation, wherein the tailored user recommendation is indicative of one or more data values included in the veteran profile; and provide, in real-time, the tailored user recommendation.

16. The computer program product of claim 15, wherein the software instructions, when executed, further cause the apparatus to:

determine a veteran status for the user; and in an instance in which the veteran status is affirmative, generate the veteran profile for the user.

17. The computer program product of claim 16, wherein the software instructions, when executed, further cause the apparatus to:

determine, using a veteran status classification model, whether a confirmatory veteran data instance is included in user data, wherein the confirmatory veteran data instance is identified based on at least one of an associated data type or an associated data source; and in an instance in which it is determined that the user data includes the confirmatory veteran data instance, determine an affirmative veteran status for the user.

18. The computer program product of claim 15, wherein the software instructions, when executed, further cause the apparatus to:

determine, using the preprocessing model, a data requirement rule set, wherein the data requirement rule set comprises one or more rules indicative of at least one of one or more data types or one or more data sources inferred to be relevant to the veteran attribute data field, wherein the qualifying data instance is determined in response to determining that the data instance satisfies the one or more rules.

19. The computer program product of claim 15, wherein the software instructions, when executed, further cause the apparatus to detect, based on the veteran profile, a trigger event, wherein (a) the trigger event is associated with a data value for the veteran attribute data field, and (b) the tailored user recommendation is generated in response to detection of the trigger event.

20. The computer program product of claim 15, wherein the software instructions, when executed, further cause the apparatus to adjust the confidence score threshold based on the veteran attribute data field.

* * * * *